United States Patent
Boocock et al.

[15] 3,697,538
[45] Oct. 10, 1972

[54] 2,4,5-SUBSTITUTED N-OXY AND HYDROXYIMIDAZOLES

[72] Inventors: David G. B. Boocock, Palo Alto; Edwin F. Ullman, Atherton, both of Calif.

[73] Assignee: Synvar Associates, Palo Alto, Calif.

[22] Filed: June 3, 1968

[21] Appl. No.: 733,820

[52] U.S. Cl. ..............260/309, 252/401, 260/213, 260/296 AE
[51] Int. Cl. ..............................C07d 49/36
[58] Field of Search.........................260/309

[56] References Cited

UNITED STATES PATENTS 3,341,549  9/1967  Henry..................260/309

OTHER PUBLICATIONS

Karrer, Organic Chemistry, 2nd English Ed., pages 901 to 902, Elsevier Pub. Co. Inc. NY (1946)
Houben–Weyl, Methoden der Organischen Chemie, 4th Ed., vol. VIII, pages 346 to 347.
Georg Thieme Verlag, Stuttgart, Germany (1952)
Osiecki et al. Journ. Am. Chem. Soc. vol. 90, pages 1078 to 1079 Feb. 14, 1968

*Primary Examiner*—John D. Randolph
*Attorney*—Townsend and Townsend

[57] ABSTRACT

Dihydroimidazoles having tertiary carbon atoms in the number 4 and number 5 positions of the imidazole ring, oxidized ring nitrogen atoms in the form of oxides and hydroxides and a

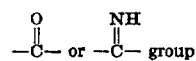

attached to the carbon atom at the 2 imidazole ring position. The free radical structures are useful as spin labels when bonded to other molecules through the

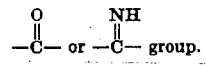

group.

12 Claims, No Drawings

2,4,5-SUBSTITUTED N-OXY AND HYDROXYIMIDAZOLES

This invention relates to imidazoles such as described in copending U.S. patent applications, Ser. No. 696,718 now abandoned, filed Jan. 10, 1968 and Townsend and Townsend file No. 3652-8, filed about Apr. 29, 1968, and further characterized by having a carbon atom, bearing a doubly bonded oxygen or nitrogen atom, attached to the carbon atom in the number 2 imidazole ring position and to methods for their preparation.

In its broadest aspect the present invention is directed to novel compounds having the general formula:

(1) 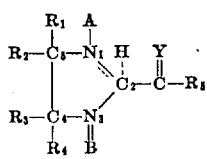

wherein:

each of $R_1$, $R_2$, $R_3$ and $R_4$ is an alkyl group, an alkenyl group, an alkynyl group, an aryl group, each of about one to 12 carbon atoms or forms part of an alkylene or alkenylene group $R_1$---$R_2$ or $R_3$---$R_4$, each alkylene and alkenylene group having about three to 10 carbon atoms. $R_1$, $R_2$, $R_3$ and $R_4$ are preferably identical and of up to 4 carbon atoms such as methyl, ethyl, n-propyl, iso-propyl, n-butyl, isobutyl, sec-butyl and tert-butyl;

each of the atom pairs $N_1$===$C_2$ and $N_3$---$B$ is joined by a single or a double bond provided that only when the atom pair $N_1$===$C_2$ is joined by a single bond, a hydrogen atom is also bonded directly to $C_2$;

A and B are selected from the hydroxyl group and oxygen and hydrogen atoms according to the order of the bond between the atom pairs $N_1$---$C_2$ and $N_3$---$B$ as follows:

1. the atom pairs $N_1$---$C_2$ and $N_3$---$B$ are both joined by single bonds: A and B are both hydroxyl groups;
2. the atom pairs $N_1$---$C_2$ and $N_3$---$B$ are both joined by double bonds: A and B are both oxygen atoms;
3. the atom pair $N_1$---$C_2$ is joined by a double bond and the atom pair $N_3$---$B$ is joined by a single bond: A is an oxygen atom an B is selected from the oxygen and hydrogen atoms and the hydroxyl group;

Y is selected from O and NH; and $R_5$ is selected from —$OR_6$ and —$NR_6R_6$, with the proviso that each $R_6$ is independently selected fro hydrogen or an organic radical such as an alkyl or aryl group of up to 30 carbon atoms. Thus $R_6$ is of similar scope to $R_5$ as defined in Ser. No. 696,718 now abandoned, supra and can also include hydrocarbon or non-hydrocarbon functional substituents such as acyl, alkyl or aryl groups substituted with halogen, hydroxyl, alkoxyl, aryloxy, amino, alkyl or arylamino, mercapto, alkyl or arylmercapto, trialkylsilyl, perfluoroalkyl, nitro, carboxyl, hydroxylamino, nitrile and the like.

Compositions in accordance with the above formula are useful as anti-oxidants. In general, the free radical structures are useful for the measurement of weak magnetic fields by known techniques. In addition, because of their free radical structure the compounds of this invention exhibit electron spin resonance (ESR) and can be used as "spin labels" for attachment to other molecules such as biologically active molecules. When used for such a purpose it will usually be desirable to select an appropriate functional group as part of $R_5$ to serve as a "handle" for bonding or attaching the free radical molecule to the biologically active molecule, or other molecule to be labeled.

It will be apparent to one skilled in this art that the imidazole ring (minus the substituent) attached at the carbon atom in the 2 ring position can have various oxidation states as disclosed by formulas I-V in Ser. No. 696,718 now abandoned, supra. However, for ease of discussion, reference will hereinafter be made to the following formula to characterize the general structure set forth above:

(2) 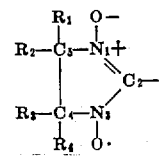

Furthermore the symbol [B—] will at times be utilized to represent the aforementioned N,N-dioxy-4,4,5,5-tetraalkyl dihydro-imidazole ring having an open valence at the carbon atom in the number 2 imidazole ring position.

In another aspect, the invention is directed to a novel process for preparing the substituted hydro-imidazoles of formula (1). Thus these novel compounds can be prepared by starting with either imidazoles such as disclosed in Ser. No. 696,718 now abandoned, supra, and having an

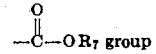

attached to the carbon atom in the number 2 imidazole ring position, or imidazoles as disclosed in Ser. No. 724,591, now abandoned, supra, having a nitrile (—C≡N) substituted for the halogen attached to the carbon atom in the 2 imidazole ring position. $R_7$ is an alkyl or aryl of up to 10 carbon atoms and preferably different than either $R_6$, as defined supra. Both of these families of 2-substituted hydroimidazoles having been found to react with either alcohols ($R_6OH$) or primary (and secondary) amines ($HNR_6R_6$) in the presence of an inert solvent to yield the aforementioned hydroimidazoles having a

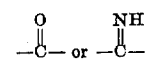

attached directly to the carbon in the number 2 imidazole ring position. In a preferred aspect, the reaction is accomplished in the presence of a small amount of basic catalyst.

Thus, the reaction of

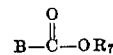

with $R_6OH$ has been found to yield an ester substitution product

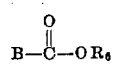

while the reaction of

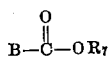

with an amine ($HNR_6R_6$) yields a substituted amide

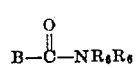

Furthermore, the reaction of B—CN with R₆OH has been found to yield an imine of the formula $$B-\overset{NH}{\underset{\|}{C}}-OR_6$$

while the reaction of B—CN with an amine (HNR₆R₆) yields $$B-\overset{NH}{\underset{\|}{C}}-NR_6R_6$$

The general formula for each of these reactions is as follows:

(2) 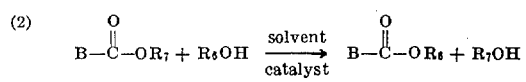

(3) 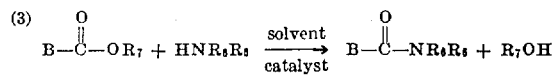

(4) 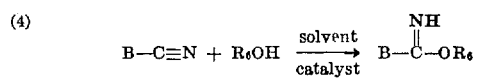

(5) 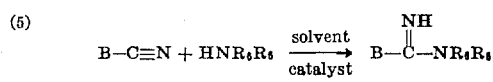

Typical alcohols for reaction with the aforementioned nitrile or ester to yield a compound defined by formulas (2) or (4), supra, include the following:

CH₃OH
C₂H₅OH
C₆H₅CH₂OH
CH₃OC₆H₄CH₂OH
CH₃OOCCH₂OH
sucrose
cellulose

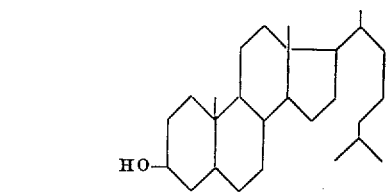

polyvinyl alcohol
CH₃CH₂CH₂CH=CHCH₂CH₂OH
HOCH₂CH₂OH

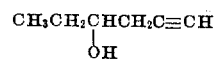

(CH₃)₂NCH₂CH₂CH₂OH
O₂N·C₆H₄OH
ClCH₂CH₂CH₂OH

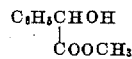

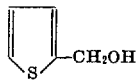

C₂H₅OCH₂CH₂OH
F₃CCH₂OH

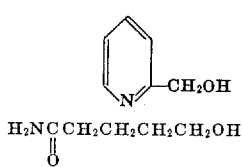

H₂NCCH₂CH₂CH₂CH₂OH
‖
O

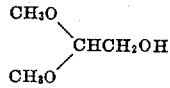

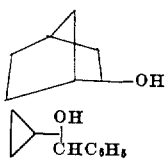

Typical amines for reaction with the aforementioned nitrile or ester to yield a compound defined by formulas (3) or (5) include the following:

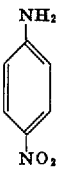

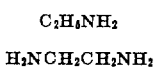

C₂H₄NH₂

H₂NCH₂CH₂NH₂

NH₂—C₂H₄—NH₂

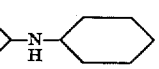

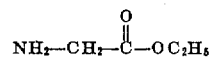

NH₂—CH₂—C—OC₂H₅
‖
O

C₄H₇NH₂

CH₃—N—CH₃
  |
  H

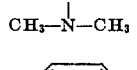

aminoethyl cellulose

It will be apparent to one skilled in this art that the reaction conditions will be most efficient when he reactants are employed in stoichiometric quantities. However, the use of excessive amounts of any reactants will not prevent the reaction from going to completion. Additionally, one skilled in this art will appreciate that reaction temperatures and pressures can be varied broadly although carrying out the reaction under elevated temperatures and atmospheric pressure conditions is preferred.

Suitable basic catalysts are well known to those skilled in this art and include the carbonates such as sodium, potassium and the like, as well as the corresponding alkoxides, and tertiary amines such as pyridine, triethylamine, and the like. Similarly, suitable inert solvents are also well known to those skilled in this art, such as dioxane, tetrahydrofuran, benzene, dimethyl sulfoxide, acetonitrile and the like.

To further illustrate the invention, the following examples are provided. It should be understood that the particular details of the examples are not to be regarded as limitations as they may be varied as will be understood by one skilled in this art.

Example I — Formation of Imidazoles Containing a Cyano Group at the 2 Ring Position Starting with the 2 - halo compounds of the U. S. Pat. application, Ser. No. 724,591, now abandoned, the cyano group can be readily substituted for the halogen in the aforementioned compounds. The following example is typical of this reaction:
2-Cyano-1,3-Dioxy-4,4,5,5-Tetramethyl-4,5-Dihydroimidazole

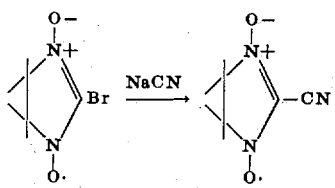

2-Bromo-1,3-dioxy-4,4,5,5-tetramethyl-4,5-dihydroimidazole (100 mg.), sodium cyanide (300 mg.) and dimethyl formamide (5 ml.) were warmed and shaken. After 15 minutes an equal volume of ether was added and the resulting mixture filtered. The filtrate was chromatographed on silica gel (56 cm. long × 4.5 cm. diam.) using ether as eluent. The fractions containing the blue-grey band were collected and evaporated. The residue was recrystallized from benzene/petroleum ether to yield the named compound 29.5 mg. (38 percent yield) m.p. 160°. Anal. calculated for $C_8H_{12}N_3O_2$: Yield C,52.73; H,6.64; N,23.06 percent, Found: C,52.97; H,6.41; N,23.14 percent. λmax (KBr) 2240 cm$^{-1}$ (C ≡ N).

Example II — Conversion of Imidazoles Having Halogen in the 2 Ring Position to Those With an Amino Group at the 2 Position The 2 — nitrile compounds readily react with an alcohol (in the presence of a basic catalyst) to yield a

by the equation:

where $R_6$ is defined supra. The following example illustrates a typical procedure for the preparation of a compound in which the halogen attached to the $C_2$ carbon is first replaced by a cyano and thereafter an alcohol added across the triple bond of the cyano group:
Methyl-(1,3-Dioxy-4,4,5,5-Tetramethyl-4,5-Dihydro-2-Imidazoyl)-Carboximidate

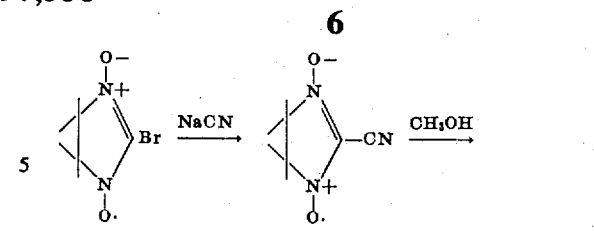

A. 2-Bromo-1,3-dioxy-4,4,5,5-tetramethyl-4,5-dihydroimidazole, sodium cyanide (200 mg.) and methanol (2ml.) were heated with stirring to just below the temperature of methenol reflux. After 30 minutes, ether (3 ml.) was added and the solution filtered. The filtrate was chromatographed on silica gel (47 cm. long × 3 cm. diam.) using ether as eluent. The blue purple band was collected an the solvent removed to yield the title compound (19 mg.) 45 percent mp. 75–77°. Found: C,50.38; H,7.69; N,19.70;Anal. calculated for $C_9H_{16}N_3O_3$; C,50.45; H,7.53; N,19.62 percent. m.w. (by mass spectrometry) 214 $_{max}^\lambda$ ($CHCl_3$) 1630 cm.$^{-1}$ (C NH).

B. Starting with the 2-cyano imidazoles the following is a typical reaction:
17-Ketoandrost-5-ene-3-β-yl (1,3,dioxy-4,4,5,5-tetramethyl -4,5-dihydro-2-imidazoyl) carboximidate

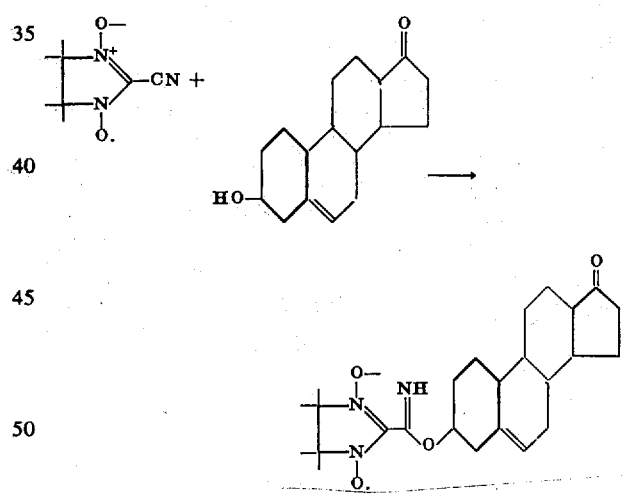

3 mg. of 2-cyano-1,3-dioxy-4,4,5,5-tetramethyl-4,5-dihydroimidazole in 2 ml. of pyridine was treated with about 20 mg. of sodium hydride and 10 mg. of 3-β-hydroxy-17-ketoandrost-5-ene. After heating with shaking for 5 minutes, the mixture had turned purple. It was then diluted with water and sufficient acetic acid was added to neutralize the strong base. The product was isolated by extraction with benzene and chromatography of the extracts. The electron spin resonance spectrum showed a five line pattern having $a_N$ 7.4 G. (benzene).

Example III — Conversion of Imidazoles having an Ester Group in the 2 Ring Position to those Having an Amido Group in the 2 Ring Position
A. 1,3-Dioxy-4,4,5,5-tetramethyl-4,5-dihydro-2-imidazoyl carboxamide

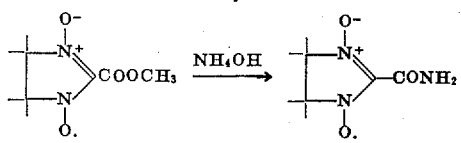

A solution of methyl 1,3-dioxy-4,4,5,5-tetramethyl-4,5-dihydro-2-imidazoyl carboxylate in concentrated ammonia was boiled for 3 minutes. The solution was then washed with benzene and acidified with acetic acid. After two extractions with chloroform the only radical remaining in the aqueous layer was the desired amide. It could be isolated by evaporation of the aqueous layer and extraction of the residue with chloroform. Chromatography of the chloroform extracts yielded the amide, identified by its ESR spectrum gave a typical 5-line pattern ($a_N$ = 7.31 G. in chloroform).

B.  N-Benzyl-1,3-dioxy-4,4,5,5-tetramethyl-4,5-dihydro-2-imidazoyl carboxamide

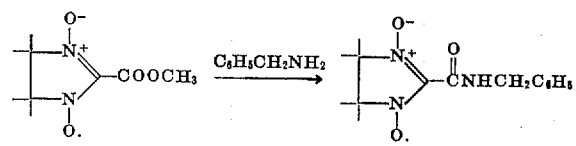

An acetonitrile solution (2 ml) of 3 mg of methyl 1,3-dioxy-4,4,5,5-tetramethyl-4,5-dihydro-2-imidazoyl carboxylate was heated with one drop of benzylamine for 15 minutes. Evaporation of the mixture and chromatography of the residue yielded the desired amide. $a_N$ = 7.31. Gauss ($CHCl_3$).

C. The imidazoyl containing a primary amido group can also be obtained by converting imidazoyls containing a 2 — imino group by reactions with a basic catalyst in an aqueous solution as illustrated as follows:

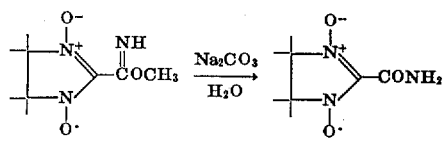

An aqueous solution of methyl (1,3-dioxy-4,4,5,5-tetramethyl-4,5-dihydro-2-imidazoyl) carboximidate containing 5 percent sodium carbonate was warmed on a steam bath for 5 minutes. The product was isolated as in A above.

Example IV — Conversion of Imidazoles having a Cyano Group in the 2 Ring Position to those having an Amidine Group in the 2 Ring Position
n-Benzyl-1,3-dioxy-4,4,5,5-tetramethyl-4,5-dihydro-2-imidazoyl carboxamidine

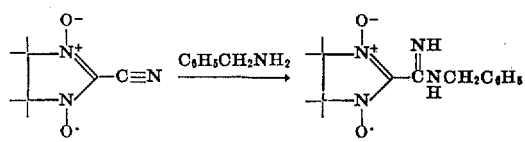

An acetonitrile solution (ml) of 3 mg of 1,3-dioxy-4,4,5,5-tetramethyl-4,5-dihydro-2-imidazonitrile was heated with one drop of benzylamine for 15 minutes. Evaporation of the mixture and chromatography of the residue yielded the desired amidine $A_n$ = 7.48 Gauss (benzene).

In the foregoing examples the symbol has been used to indicate the structure:

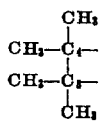

Although the foregoing invention has been described in some detail by way of illustration for purposes of clarity of understanding, it will be apparent to one skilled in this art that certain changes and modifications may be practiced within the spirit of this invention as limited only by the scope of the appended claims.

What is claimed is:

1. A 4,4,5,5-tetra-substituted dihydroimidazole of the formula:

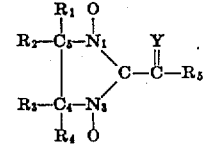

wherein
each of $R_1$, $R_2$, $R_3$, and $R_4$ is a lower alkyl group;
Y is O or NH; and
$R_5$ is —$OR_6$ or —$NR_6R_6$, wherein each $R_6$ is independently hydrogen or an organic radical.

2. A 4,4,5,5-tetra-substituted dihydroimidazole in accordance with claim 1, wherein $R_{1-4}$ is alkyl of from one to four carbon atoms, and $R_5$ is —$OR_6$, wherein $R_6$ is an organic radical of up to 30 carbon atoms.

3. A 4,4,5,5-tetra-substituted dihydroimidazole in accordance with claim 2, wherein $R_6$ is hydrogen.

4. A 4,4,5,5-tetra-substituted dihydroimidazole in accordance with claim 1, wherein $R_1$-$R_4$ is alkyl of from one to four carbon atoms, and $R_5$ is —$NR_6R_6$, wherein $R_6$ is an organic radical of up to 30 carbon atoms.

5. A 4,4,5,5-tetra-substituted dihydroimidazole in accordance with claim 4, wherein $R_6$ is hydrogen.

6. A 4,4,5,5-tetra-substituted dihydroimidazole in accordance with claim 1, wherein $R_1$-$R_4$ is alkyl of from one to four carbon atoms and Y is O.

7. A 4,4,5,5-tetra-substituted dihydroimidazole in accordance with claim 1, wherein Y is —NH.

8. A 4,4,5,5-tetra-substituted dihydroimidazole in accordance with claim 1 wherein $R_6$ is hydrocarbon of up to 30 carbon atoms.

9. A 4,4,5,5-tetra-substituted-1,3-diazole of the formula:

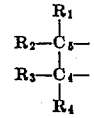

wherein: the bonds to $C_4$ and $C_5$ are joined by a divalent radical of the formula:

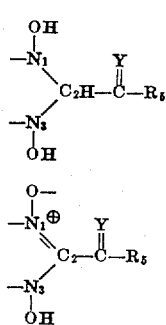

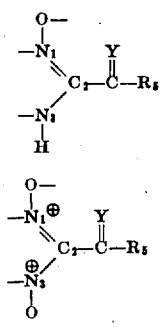

or

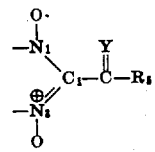

wherein $R_1$-$R_4$ is a lower alkyl group;
Y is O or NH; and $R_5$ is —$OR_6$ or —$NR_6R_6$, with the proviso that each $R_6$ is independently selected from hydrogen or an organic radical.

10. A 4,4,5,5-tetra-substituted diazole in accordance with claim 9 wherein, $R_1$-$R_4$ alkyl of from one to four carbon atoms and $R_5$ is —$OR_6$, wherein $R_6$ is hydrocarbon of up to 30 carbon atoms.

11. A 4,4,5,5-tetra-substituted-1,3-diazole in accordance with claim 9 wherein, $R_1$-$R_4$ are alkyl of from one to four carbon atoms and $R_5$ is —$NR_6R_6$, wherein $R_6$ is hydrocarbon of up to 30 carbon atoms.

12. A 4,4,5,5-tetra substituted-1,3-diazole in accordance with claim 9 wherein, $R_6$ is hydrogen.

* * * * *